United States Patent
Hagan

(10) Patent No.: US 8,090,361 B2
(45) Date of Patent: Jan. 3, 2012

(54) METHODS AND SYSTEMS FOR MONITORING COMPUTER SYSTEMS USING WIRELESS DEVICES

(75) Inventor: Guy R Hagan, Snellville, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 710 days.

(21) Appl. No.: 11/535,722

(22) Filed: Sep. 27, 2006

(65) Prior Publication Data

US 2008/0194239 A1    Aug. 14, 2008

Related U.S. Application Data

(60) Provisional application No. 60/808,748, filed on May 26, 2006.

(51) Int. Cl.
*H04M 3/42*    (2006.01)
(52) U.S. Cl. .............. 455/414.4; 455/414.1; 455/414.2; 455/414.3
(58) Field of Classification Search .... 455/414.1–414.5, 455/423
See application file for complete search history.

(56) References Cited

U.S. PATENT DOCUMENTS

| | | | | |
|---|---|---|---|---|
| 5,768,501 | A * | 6/1998 | Lewis | 714/48 |
| 6,014,089 | A * | 1/2000 | Tracy et al. | 340/870.02 |
| 2004/0203889 | A1* | 10/2004 | Karaoguz | 455/456.1 |
| 2005/0149442 | A1* | 7/2005 | Adams et al. | 705/51 |
| 2007/0061328 | A1* | 3/2007 | Ramer et al. | 707/10 |
| 2007/0219732 | A1* | 9/2007 | Creus et al. | 702/61 |
| 2009/0021585 | A1* | 1/2009 | Ko et al. | 348/184 |

* cited by examiner

*Primary Examiner* — Wayne Cai
(74) *Attorney, Agent, or Firm* — Hope Baldauff Hartman, LLC

(57) ABSTRACT

Methods and systems for providing information regarding monitored computer systems to wireless devices are provided. Information may be requested by a wireless device and displayed on the wireless device in a browser. The web server application may detect the wireless device, and may also then specially format the response, including the requested information formatted for optimized delivery and/or display on a wireless device. The web server application may also send a message to a wireless device about events associated with the monitored computer systems.

18 Claims, 6 Drawing Sheets

METHODS AND SYSTEMS FOR MONITORING COMPUTER SYSTEMS USING WIRELESS DEVICES

CROSS REFERENCE TO RELATED APPLICATIONS

This application claims the benefit of U.S. Provisional Application No. 60/808,748, entitled "Methods, Systems, and Computer-Readable Media for Monitoring a Computer System Using a Mobile Device," filed on May 26, 2006, which application is incorporated herein by reference in its entirety.

FIELD OF THE INVENTION

The present invention relates generally to monitoring computer systems remotely. More particularly, the present invention relates to monitoring computer systems remotely by receiving data regarding the computer systems via mobile devices and responding to the received data via the wireless devices.

BACKGROUND

System administrators, project managers, and other interested individuals have a need to stay abreast of computer and application availability. When a server hosting a business-critical software application crashes, these individuals may be responsible for troubleshooting the problems and/or handling the fallout. Short of having someone standing next to a key server twenty-four hours a day, it may be important for these individuals to be kept abreast of network, computer, and application problems, even when they are away from the systems.

Current software products enable interested individuals to learn about, track, and follow up on hardware and software problems. These problems may be noted in log files, which keep a running list of problems. Problems may also be noted in a trouble ticket system, which may track reports of issues from other individuals. These software products may enable users to query and review lists of issues for a single piece of software, a piece of hardware, or a large collection of hardware and software. Such information may be solicited and provided to users via a web browser software application on a network-connected computer. However, existing solutions may not provide requested content in a format suitable for use with a wireless device, such as a phone or personal digital assistant. Having such information available in a format suited for wireless devices might enable individuals to retrieve up-to-the-minute information about software and hardware of interest, regardless of their location.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods according to embodiments of the invention are for responding to a request for status information about monitored computer systems. The request is received from a wireless device, and the information is retrieved. Once it is determined that the source of the request is a wireless device, the information may be specially formatted for display, such as minimizing the display for the smaller screen of the wireless device.

Systems according to embodiments of the invention are for providing information about monitored computer systems. A system may include a processor, network interface, and memory, the memory storing instructions. The instructions include receiving a request from a remote wireless device for information about monitored computer systems, retrieving the requested information, formatting a response to the request, and sending the response to the remote wireless device.

Other apparatuses, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

DETAILED DESCRIPTION

Figure 1:
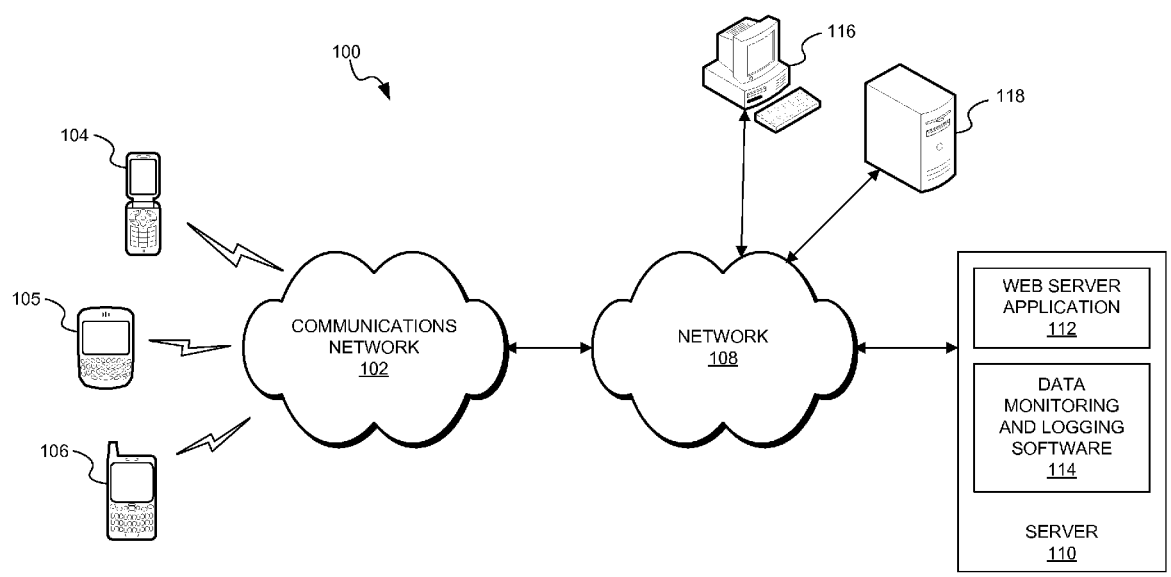
FIG. 1 is an illustrative operating environment for one or more embodiments of the present invention.

Embodiments of the present invention provide methods and systems for monitoring computer systems using wireless devices. In the following detailed description, references are made to the accompanying drawings that form a part hereof, and which are shown, by way of illustration, using specific embodiments or examples. Referring now to the drawings, in which like numerals represent like elements through the several figures, aspects of the apparatus and methods provided herein will be described.

FIG. 1 and the following discussion are intended to provide a brief, general description of a suitable computing environment in which embodiments of the invention may be implemented. While embodiments of the invention will be described in the general context of program modules that execute in conjunction with an application program that runs on an operating system on a computer system, those skilled in the art will recognize that embodiments of the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and other computer systems having at least one processor and a memory for storing program modules. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment 100 for various embodiments of the present invention will be described. As shown, a communications network 102, such as a cellular network, in communication with a network 108 interconnects wireless devices 104, 105, 106 with a server 110 and potentially other computer systems 116, 118 connected to or accessible through the network 108. In an embodiment of the present invention, the computer systems 116, 118 may include test systems, production systems, desktop computers, storage devices, network components (e.g., routers and gateways), and other hardware able to communicate electronically. It should be appreciated that the network 108 may comprise any type of wireline or wireless computing network, including a local area network, a campus network, a wide area network, or any other electronic communications network, for example, the Internet. The communications network 102 may include any conventional cellular network operative to transmit information to and receive information from the network 108, including but not limited to a Global System for Mobile Communications (GSM)/Universal Mobile Telecommunication System (UMTS) network or a GSM/General Packet Radio Service (GPRS) network. Communications network 102 may also include other forms of wireless networks including those implemented using the WiFi or WiMax standards, or any other protocol capable of carrying wireless voice and/or data communications.

The server 110 may include a computer processor in communication with computer storage (e.g., random access memory (RAM) and/or a magnetic storage device such as a hard drive), as well as a network interface for communication with other hardware, including wireless devices 104, 105, 106 and computer systems 116, 118. A network interface may take the form of, for example, an Ethernet network interface controller (NIC) or a wireless interface. The server 110 is operative to store and execute a web server application 112. The web server application 112 executes website program code and may receive and respond to requests from the wireless devices 104, 105, 106 for content supplied by data monitoring and logging software 114, such as BMC® Performance Manager, stored on the server 110. It should be appreciated that the data monitoring and logging software 114 may be stored on the server 110 or another server computer in communication with the server 110 storing the web server application 112. The data monitoring and logging software 114 may monitor the computer systems 116, 118 and collect data related to the computer systems 116, 118 and software and hardware applications executing thereon. Once the data is collected, the data monitoring and logging software 114 compiles the data into event logs which can be accessed by the wireless devices 104, 105, 106 via the web server application 112 over the cellular network 102 and the network 108.

The wireless devices 104, 105, 106 each include a browser application for accessing data through the network 108. In an embodiment of the present invention, the wireless devices 104, 105, 106 may include cellular telephones, personal digital assistants (PDA), and hand-held computing devices, such as a BLACKBERRY device from Research In Motion, Limited of Ontario, Canada. When a request for information provided by the data monitoring and logging software 114 is received at one of the wireless devices 104, 105, 106, a browser of the wireless device may retrieve and view content provided by the server 110. The requested content presented to the requesting wireless device by the web server application 112 may be associated with a display size, screen controls, and a memory size adjusted for viewing, controlling, and storing on the wireless device 104, 105, 106. The web server application 112 provides secure transmission of the requested content in a format viewable, controllable, and storable by a wireless device. Thus, status regarding a computer system such as computer system 116, may be received and responded to while away from the computer systems 116, 118.

The web server application 112 may determine a type of browser associated with a wireless device 104, 105, 106 making a content request. This information may be embedded in the content request itself, in a separate communication sent before, concurrently with, or after the content request. For example, user agent information embedded in an Hypertext Transfer Protocol (HTTP) request may include information about the type of requesting wireless device 104, 105, 106 and a browser version. Using information about the requesting wireless device 104, 105, 106, the web server application 112 may select from among multiple pages (e.g., a separate version of a web page stored for each type of browser application), or it may dynamically modify the content of the web page to customize the display formatting for each type of browser. The web server application 112 may further select or modify the content language depending on the browser. For example, the web server application 112 may format content selecting between Wireless Markup Language (WML), Extensible Hypertext Markup Language (XHTML), or normal Hypertext Markup Language (HTML) depending on the browser type. In addition, content may be formatted by utilizing different format styles or style sheets for each type of browser, such as using separate cascading style sheets (CSS) files.

Additionally, the web server application 112 may work in concert with a second application, such as the data monitoring and logging software 114. Upon receiving a content request from one of the wireless devices 104, 105, 106, the web server application 112 may dynamically request content from the second application. The response received from the second application may be dynamically reformatted in order to produce content viewable on the requesting wireless device 104, 105, 106.

Figure 2:
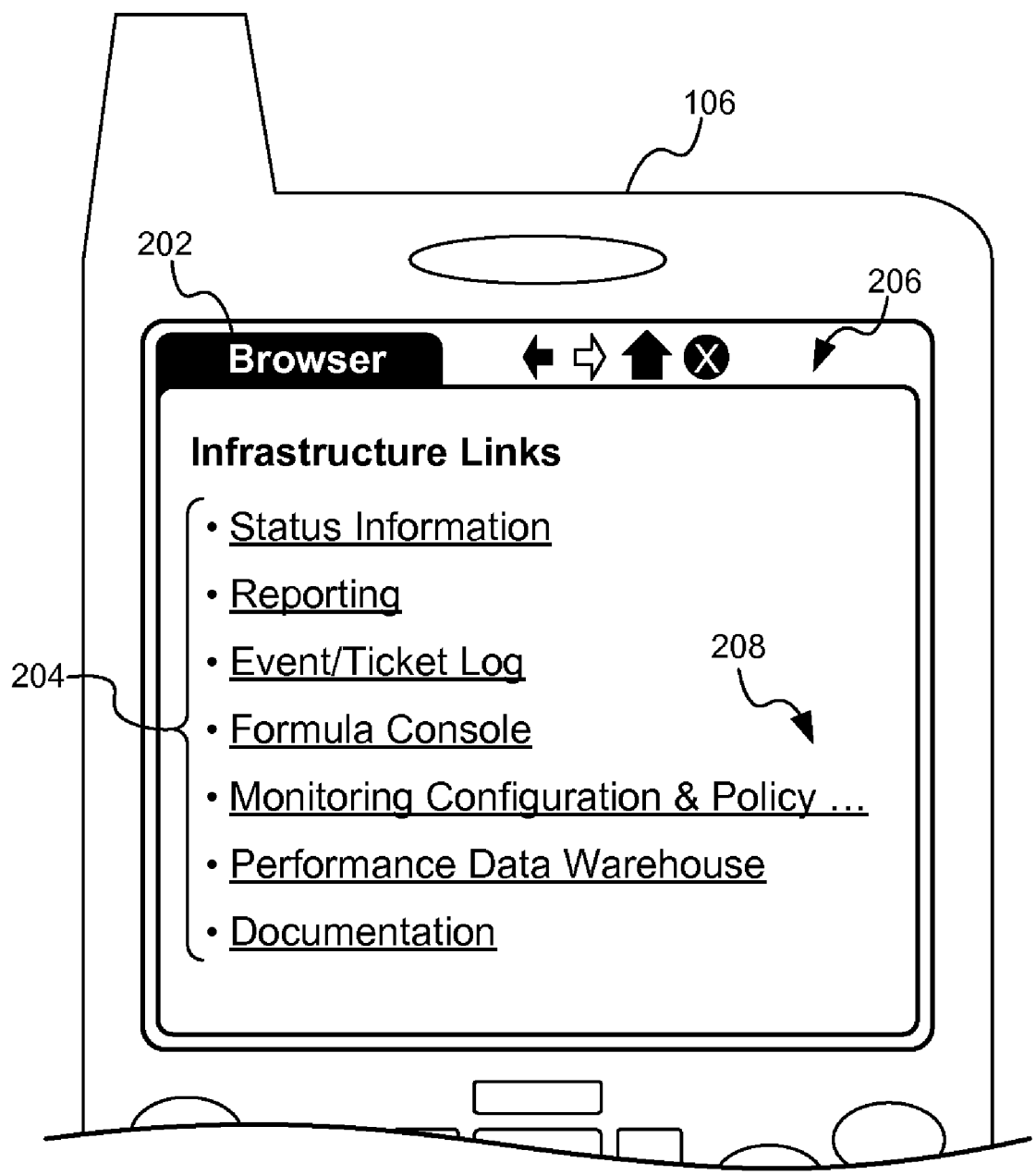
FIGS. 2-4 depict web pages displayed on a variety of wireless devices according to various embodiments of the present invention.
Figure 3:
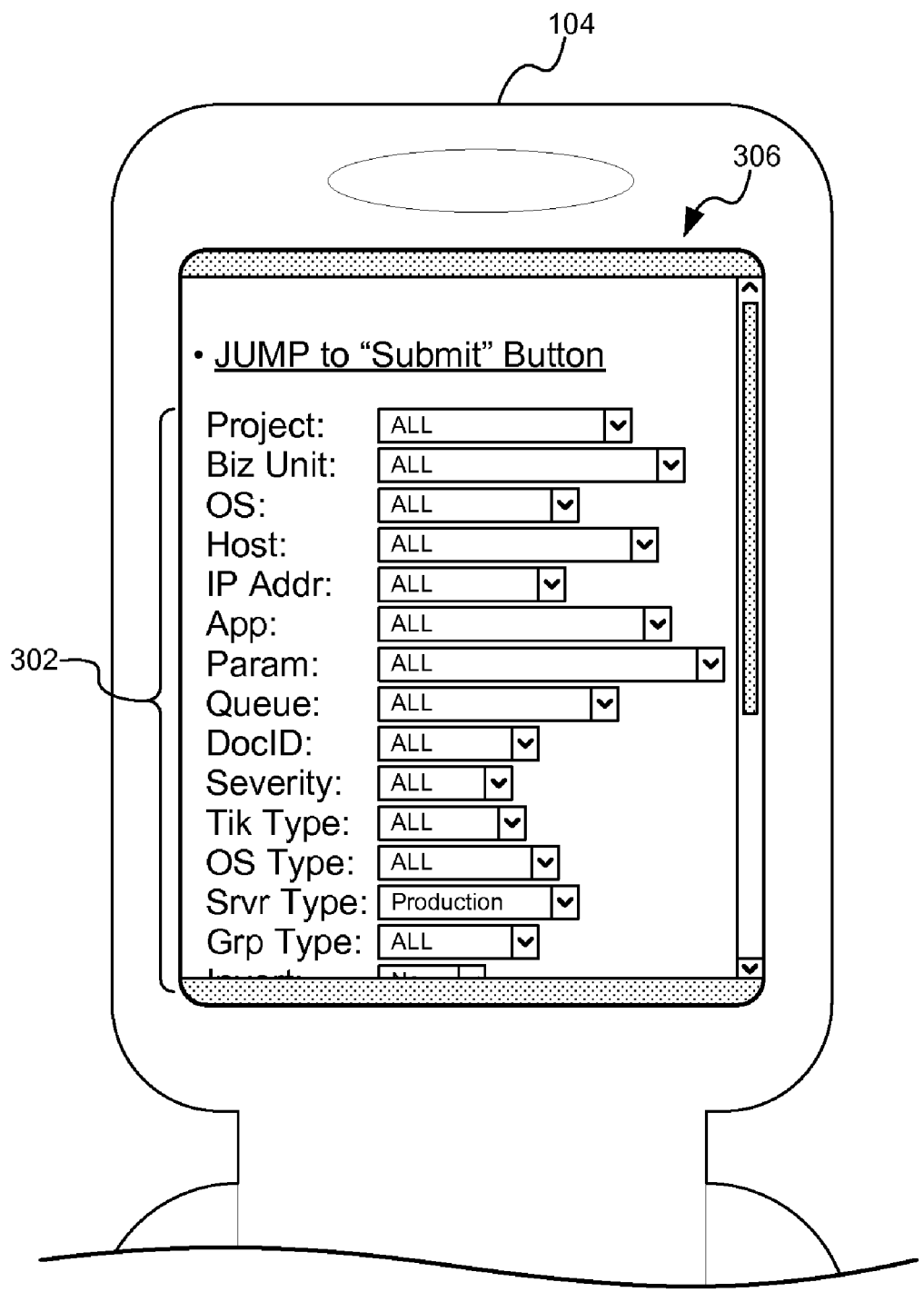
Figure 4:
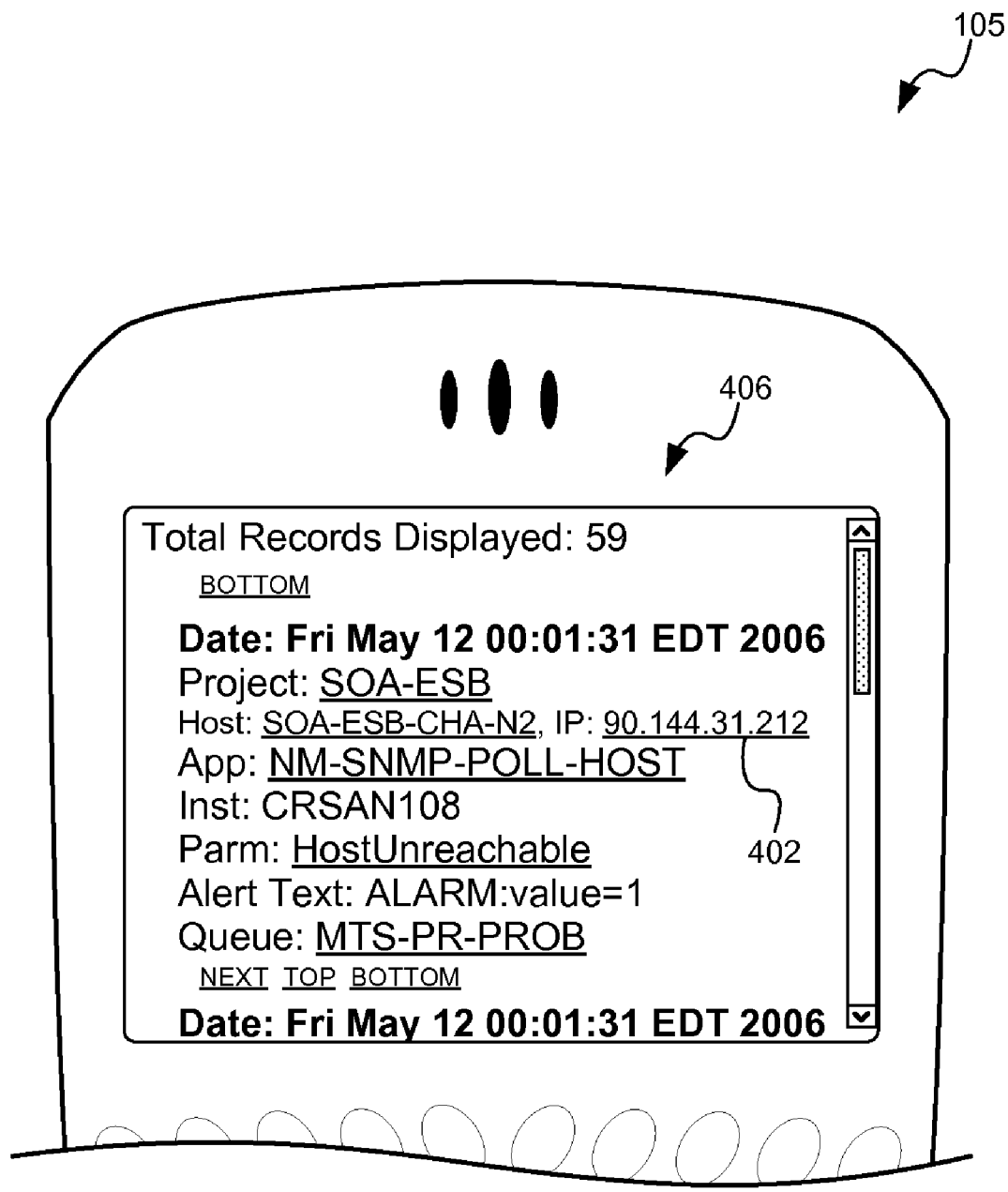

Turning now to FIGS. 2-4, details regarding the specialized formatting of content will be discussed with regard to different types of wireless devices 104, 105, 106 and browser applications. FIG. 2 depicts a web page 206 displayed on the wireless device 106 via browser application 202 including content provided by the data monitoring and logging software 114. In an embodiment of the present invention, the web page 206 may provide a list of links 204 for accessing further web pages. The web page 206 may be considered a start page, providing a jumping off point from which a user of the wireless device 106 may begin requesting and retrieving information about one or more monitored computer systems such as systems 116, 118. To retrieve the start page 206, a user may have entered an Internet address into the wireless device 106. Alternatively, the user may have selected a bookmark, or selected a link in an email or short message service (SMS) message received from the web server application 112. In selecting a bookmark or a link, the user may have used a pointing device, a mouse, a keypad, navigation buttons, audio commands, or any other form of input associated with the device 106.

Once selected, the user retrieves the start page 206 over the communications network 102, via the network 108, and ultimately from web server application 112 on server 110. When the request to retrieve the start page 206 is received at the web server application 112, the web server application 112 may extract browser and/or device information from the request. Web server application 112 may extract or derive other information about the wireless device 106 therefrom, including maximum available bandwidth, screen resolution, and other browser/device specific information. Knowing screen resolution (the number of pixels on the screen), the web server application 112 may format the response appropriately, so as to maximize the utility and/or aesthetics of the information. For example, a link 208 to "Monitoring Configuration & Policy Changes" from the list of links 204 has been shortened in order for the information to fit horizontally on the screen. Additional steps may be taken in order to format the content for the wireless device 106. For example, a font type, a font size or a font format may be adjusted, text may be replaced with ellipses, and/or graphics may be replaced or removed. Likewise the entire layout of a web page may be completely modified to enable the information to be properly viewed on the wireless device 106. For example, content being primarily horizontal in format (e.g., table with one row and multiple columns), may be reformatted to be primarily vertical (e.g., table with one column and multiple rows).

If a user selects one of the links on the start page 206, the wireless device 106 will send another request for information to the server 110. FIG. 3 depicts an example of a criteria page 306 delivered to another wireless device 104. Here, the criteria page 306 includes multiple criteria which can be used to filter and sort issues and/or events associated with monitored hardware and software on computer systems 116, 118. Examples of criteria for filtering and sorting are shown at 302, and include, but are not limited to, Application, Operating System, Internet Protocol (IP) Address, Severity, and any other criteria that can be used to filter and sort events associated with monitored hardware and software systems. Some of these criteria may be associated specifically with logged problems and/or with ticketed issues.

The formats controlling the display of the criteria page 306 on the wireless device 104 were modified by the web server application 112 based on the browser and/or device information of the wireless device 104 associated with the request. The display on the device 104 is narrower than a normal web browser on a personal computer, narrower even than the displays of the other two wireless devices 105, 106. Subsequently, the size or appearance of fonts or controls may be modified at the web server application 112 so as to fit the display associated with the wireless device 104. Also, text may be abbreviated and/or otherwise changed so as to fit in the space available. Further format modifications are possible such as, but not limited to, placing selection pull-downs below their respective labels rather than adjacent to them as shown on the criteria page 306. Once one or more criteria, if any, have been selected, and the page submitted as a new request to web server application 112, the results of the request may be displayed, such as shown in FIG. 4.

FIG. 4 depicts an example of a results page 406 showing information collected regarding the status of monitored computer hardware and software systems on computer systems 116, 118. Here the content is again being shown on yet another device 105. Although shown on different devices in FIGS. 2-4 in embodiments of the present invention, the results of selecting a link or submitting criteria will appear on the same device. The results shown on results page 406 may be purely textual as shown here, so as to avoid using additional bandwidth. In further embodiments, the results may include graphics, video, and audio. The modification to the format shown may be the result of the web server application 112 detecting the browser and/or device information associated with the device 105 and removing any graphics and/or extraneous information from the results.

Results shown on the results page 406 may be enabled to include additional information about the results. For example, items relevant to an exception, issue, or ticket listed in the results may include links to enable the retrieval of additional information. For example, an IP Address associated with the first result on the results page 406 may include a link 402 as shown. If a user selects the link 402, the device 105 may send a second request to the server 110 for information about the status of associated computer hardware and software systems. Other exceptions or tickets associated with the particular IP Address may be returned as a new results page 406. Alternatively, contact or other information associated with the associated machine may be presented as a new page. Contact information may include a phone number, email address, or other means for communicating an entity that maintains responsibility for the machine. Once contacted, this person or organization may then be able to troubleshoot or repair the issue if it is ongoing.

Although not shown, results page 406 may present options for repairing or otherwise handling an exception. For example, one additional link may include "Restart Affected Application." When clicking on such a link or command, the affected application or hardware on the computer system 116, 118 may be restarted or otherwise reset. The link or command may directly request that the affected application or hardware be restarted, for example, causing the operating system on the affected device to restart the application and/or restart the hardware itself. Likewise, other links may include, "Notify Relevant Vendor." Such a link may enable a notification of the failure or exception to be passed on to a vendor or other responsible party. Such a notification may be an automated email or SMS message sent to the appropriate individuals. Alternatively, the link may register information about the exception with a log on a remote server which then passes information about the exception to the appropriate individuals as needed. Additional links may enable the use of remote desktop capabilities, similar to collaboration products provided by Citrix Systems, Inc. of Fort Lauderdale, Fla., enabling a user of wireless device 105 to view and manipulate a virtual desktop or interface of an affected piece of hardware or software on computer systems 116, 118. Additional commands or links enabling repair or notification may be included with results page 406.

Figure 5:
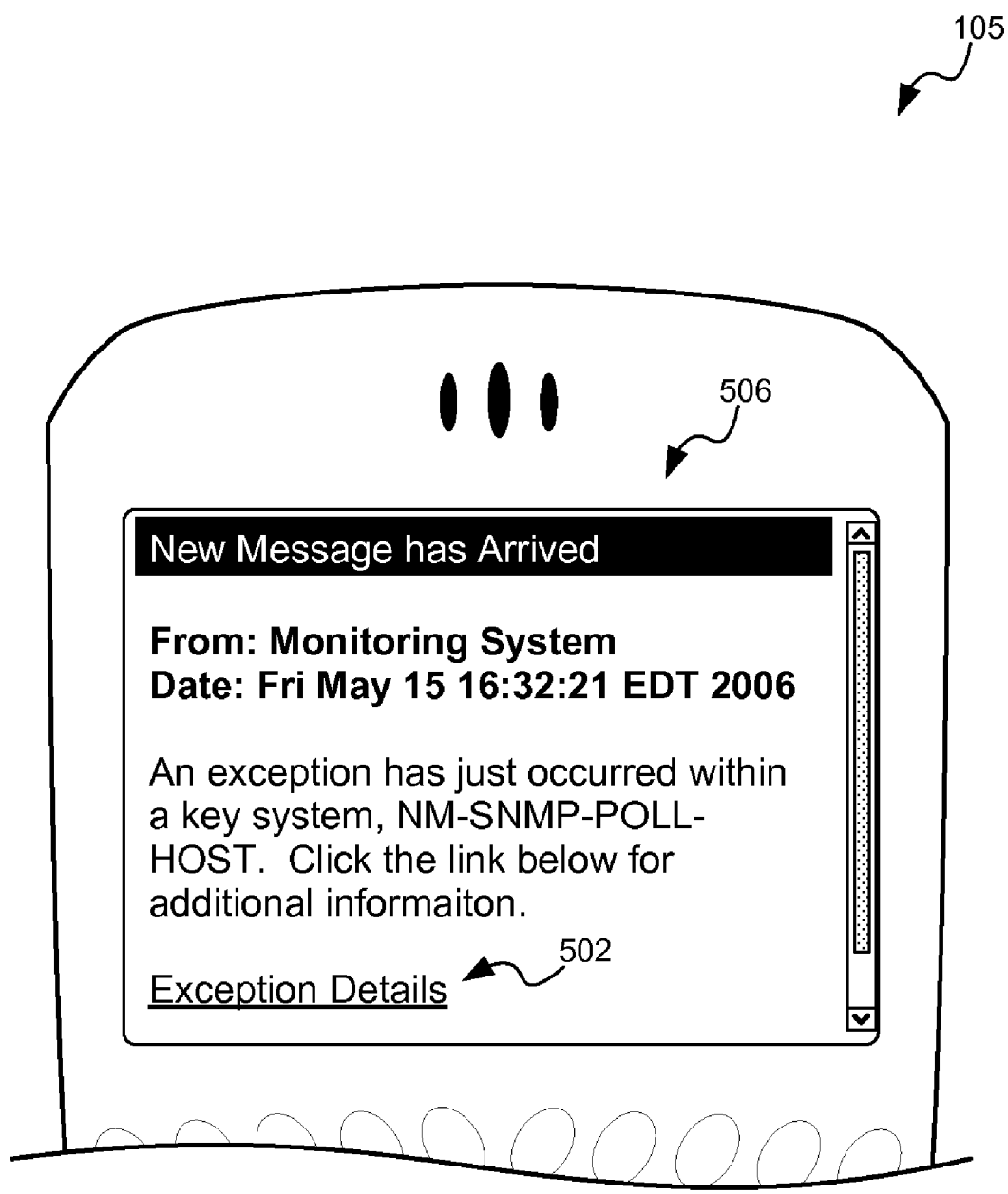
FIG. 5 depicts a message about a monitored computer system displayed on a wireless device.

FIG. 5 depicts the wireless device 105 receiving a message 506 with information about a recent exception. The message 506 may be delivered using SMS, Multimedia Messaging Service (MMS), electronic mail, or another textual format. The server 110 may compose the message 506 when it determines that the information should be sent to the wireless device 105. The message 506 may include basic information about the problem or event, including application or server name, for example. The message 506 may also include a link 502 to additional information about the problem. Here, the issue may have been a software exception in one of the computer systems 116, 118, but hardware problems, trouble tickets, and any other logged or reported information about monitored hardware and software systems may be supplied. When a user of the wireless device 105 selects the included link, the user may be directed to a browser displaying results in a format similar to the results page 406.

As above, although not shown, message 506 may include additional links providing access to specific functions (e.g., restarting an application or server) or specialized software (e.g., virtual network computing (VNC)) enabling a user of wireless device 105 to repair or otherwise manipulate affected hardware or software on the computer systems 116, 118.

Figure 6:
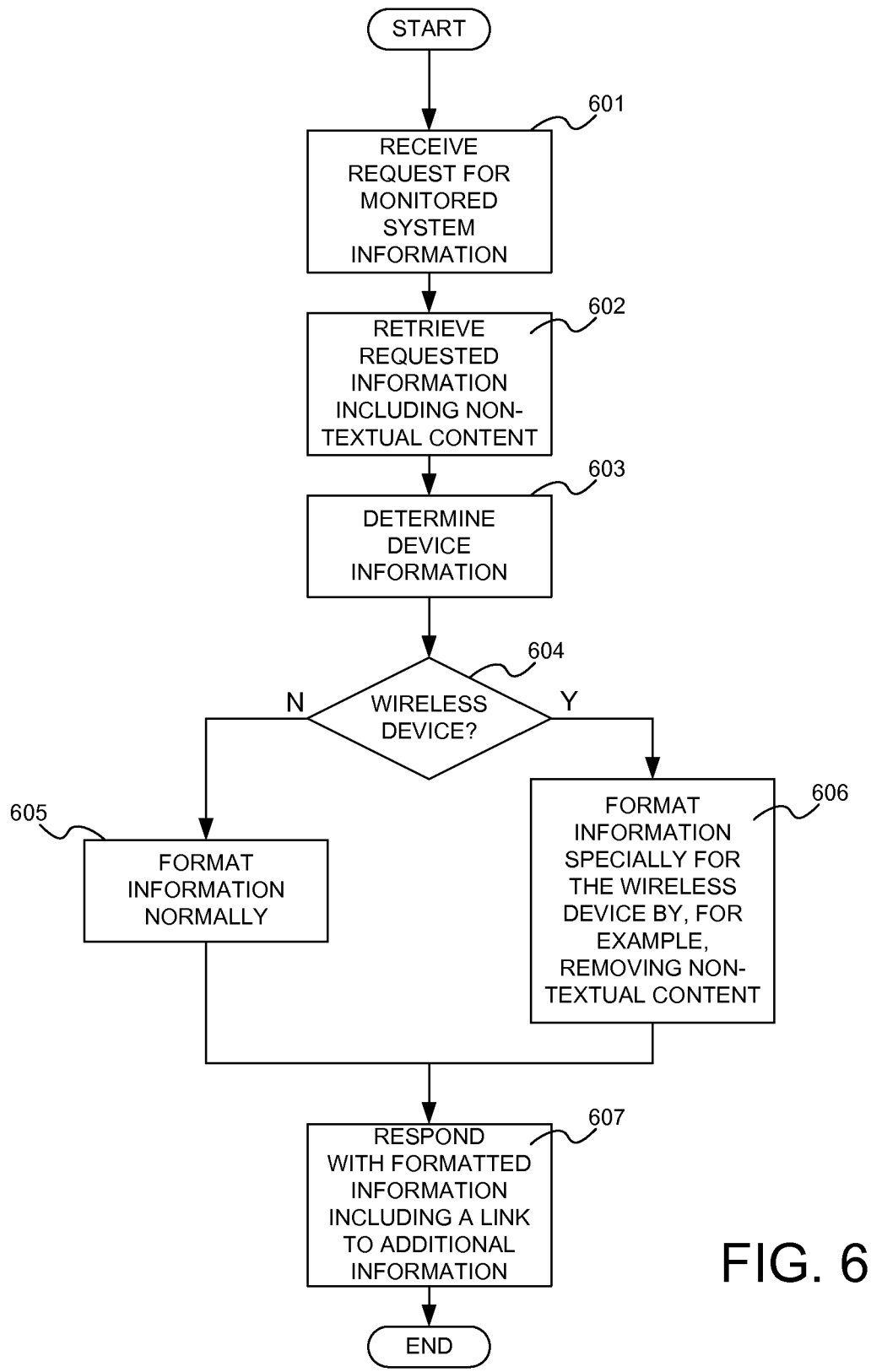
FIG. 6 is a flowchart depicting an example of a process for providing information about a monitored computer system.

FIG. 6 is a flowchart depicting an example of a process for providing information about monitored computer systems 116, 118 to the wireless devices 104, 105, 106 according to various embodiments of the present invention. The logical operations of the various implementations presented, including those of FIG. 6, may be (1) a sequence of computer implemented acts or program modules running on the server 110 and/or (2) interconnected machine logic circuits or circuit modules within the server. The implementation is a matter of choice dependent on the performance requirements of the computer on which the embodiments are implemented. Accordingly, the logical operations making up the implementations are referred to variously as operations, structural devices, acts, or modules. It will be recognized by one skilled in the art that these operations, structure devices, acts, and modules may be implemented in software, in firmware, in special purpose digital logic, and/or any combination thereof without deviating from the spirit and scope of the attached claims. Moreover, it will be apparent to those skilled in the art that the operations described may be combined, divided, reordered, skipped, and otherwise modified, also without deviating from the spirit and scope of the attached claims.

At 601, web server application 112 receives a request for information about monitored computer systems 116, 118. Such a request may be in the form of an HTTP request, and may include information about the requesting device and/or application. At 602, the requested information is retrieved by web server application 112. Here, the information may be in any format. For example, the requested information may be in the form of log files, query results, formatted web pages, text files, or any other electronic format. At 603, the web server application 112 determines information about the requesting device and/or application. This determination may be derived from the request itself, from a separate communication provided before, concurrently with, or after the request, or from other stored information about the requesting device (e.g., a database table of IP Addresses cross-referenced to device types). If, at 604, the device is not a wireless device, then the requested information at 605 may be formatted normally by web server application 112, as for a conventional web browser on a personal computer. If the device is wireless, then at 606, web server application 112 formats the requested information specially for the diminutive aspects of the wireless device.

Specialized formatting performed by web server application 112 may include removing images, abbreviating text, removing extraneous information, resizing text and/or controls, reorienting a page layout, and other steps required to enable display of the requested information. In addition, specialized formatting performed by web server application 112 may be achieved by referencing a style sheet unique to the device and/or browser. Specialized formatting performed by web server application 112 may also be achieved by providing pre-formatted pages of information previously prepared (e.g., static web pages unique to the device). Specialized formatting performed by web server application 112 may take into account the specific model of wireless devices 104, 105, 106 and browser versions, or alternatively, a single specialized format may be utilized for all requesting devices, one which minimizes the size of text and the size of any transmission, for example. At 607, the formatted information is supplied by web server application 112 in response to the initial request.

It will be appreciated that embodiments of the present invention provide methods, systems, and apparatuses for monitoring computer hardware and software systems remotely by receiving data regarding problems and events via a wireless device and responding to the received data via the wireless device. Although the invention has been described in language specific to computer structural features, methodological acts, and by computer readable media, it is to be understood that the invention is not necessarily limited to the specific structures, acts, or media described. Therefore, the specific structural features, acts, and mediums are disclosed as exemplary embodiments implementing the invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention.

What is claimed is:

1. A method for providing information about a monitored system, the method comprising:
receiving a request for information about the monitored system from a wireless device, wherein device information associated with the wireless device is embedded in the request and wherein the device information comprises an available bandwidth associated with the wireless device;
retrieving the information about the monitored system, a portion of the information comprising non-textual content;
determining that the request for the information originated with the wireless device;
formatting a response including the information about the monitored system for the wireless device based on the available bandwidth associated with the wireless device determined from the device information, wherein formatting the response comprises removing the non-textual content from the information to avoid using additional bandwidth beyond the available bandwidth associated with the wireless device, the response comprising a repair option corresponding to an exception associated with the monitored system;
sending the response formatted for the wireless device to the wireless device;
receiving a selection of the repair option; and
in response to receiving the selection, providing a request to the monitored system to restart.

2. The method of claim 1, wherein receiving the request comprises receiving the request from a browser application on the wireless device.

3. The method of claim 2, wherein receiving the request comprises receiving a hypertext transfer protocol request from the browser application.

4. The method of claim 1, wherein formatting the response includes adjusting the information such that the information is displayable on the wireless device.

5. The method of claim 1, wherein the information about the monitored system comprises incident information regarding a software application.

6. The method of claim 1, wherein the information about the monitored system comprises trouble ticket information.

7. The method of claim 1, wherein sending the response comprises sending a link which, when accessed, provides additional information about the monitored system.

8. A system for providing information about a monitored computer system, the system comprising:
- memory for storing a program containing code for providing information about a monitored computer system;
- a processor functionally coupled to the memory, the processor being responsive to computer-executable instructions contained in the program and configured to:
  - receive a request for information about the monitored computer system from a wireless device, wherein device information associated with the wireless device is embedded in the request and wherein the device information comprises an available bandwidth associated with the wireless device,
  - retrieve the information about the monitored computer system, a portion of the information comprising non-textual content,
  - determine a type of browser application associated with the wireless device based on the device information embedded in the request,
  - format a response to the request for the wireless device based on the available bandwidth associated with the wireless device determined from the device information, wherein formatting the response comprises removing the non-textual content from the information to avoid using additional bandwidth beyond the available bandwidth associated with the wireless device, and selecting a web page from a plurality of web pages that is associated with the type of browser application determined to be associated with the wireless device for providing the response to the wireless device, the response comprising a repair option corresponding to an exception associated with the monitored system,
  - in response to the request, send the response formatted for the wireless device to the wireless device,
  - receive a selection of the repair option, and
  - in response to receiving the selection, provide a request to the monitored system to restart; and
- a network interface for enabling communication between the processor and the wireless device.

9. The system of claim 8, wherein formatting the response includes adding a link to additional information about the monitored computer system.

10. The system of claim 8, wherein receiving the request comprises receiving the request from the browser application on the wireless device.

11. The system of claim 8, wherein receiving the request comprises receiving a hypertext transfer protocol request from the browser application.

12. The system of claim 11, wherein the processor is further configured to:
- format the response for display on the remote device, wherein formatting comprises minimizing the amount and size of the information for display.

13. The system of claim 8, wherein the processor is further configured to:
- monitor a status of the monitored computer system;
- determine that the status has changed;
- log the status change in a log file; and
- retrieve the information requested from the log file.

14. The system of claim 8, wherein retrieving the information comprises retrieving incident information regarding an executing software application.

15. The system of claim 8, wherein retrieving the information comprises retrieving trouble ticket information.

16. A method for delivering information about a monitored computer system, the method comprising:
- receiving information about the monitored computer system, a portion of the information comprising non-textual content;
- receiving a request for the information about the monitored computer system from a remote wireless device, wherein device information associated with the remote wireless device is embedded in the request and wherein the device information comprises an available bandwidth associated with the remote wireless device,
- composing a message for delivery to the remote wireless device based on the available bandwidth associated with the remote wireless device determined from the device information, the message comprising a link to detailed information about the monitored computer system and a repair option corresponding to an exception associated with the monitored computer system, wherein composing the message comprises removing the non-textual content from the information to avoid using additional bandwidth beyond the available bandwidth associated with the remote wireless device;
- forwarding the message for delivery to the remote wireless device;
- receiving a selection of the repair option; and
- in response to receiving the selection, providing a request to the monitored computer system to restart.

17. The method of claim 16, wherein composing the message comprises composing one of a simple messaging service message and an electronic mail message.

18. The method of claim 16, wherein composing the message comprises including information about an event associated with the monitored computer system.

* * * * *